Figure 1:
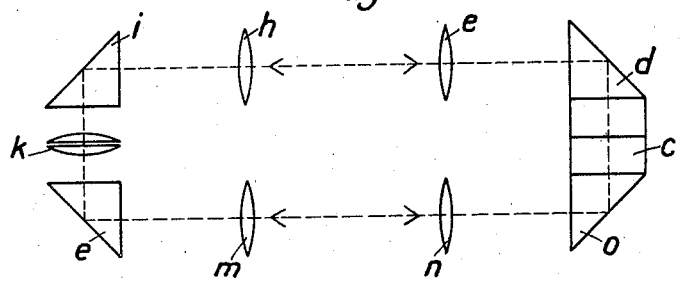

Oct. 13, 1931.  W. THORNER  1,826,844
TELESCOPIC INSTRUMENT FOR SUBJECTIVE DETERMINATION
OF THE REFRACTION OF THE EYE
Filed July 22, 1929

Inventor:
Walther Thorner,
By Byrnes Townsend & Bickerstein,
Attorneys.

Patented Oct. 13, 1931

1,826,844

UNITED STATES PATENT OFFICE

WALTHER THORNER, OF BERLIN, GERMANY

TELESCOPIC INSTRUMENT FOR SUBJECTIVE DETERMINATION OF THE REFRACTION OF THE EYE

Application filed July 22, 1929, Serial No. 380,042, and in Germany July 25, 1928.

This invention relates to a device for the subjective determination of the refraction of the eye by means of an adjustable telescope.

It is known for the purpose of subjective determination of the refraction of the eye to employ in place of a number of glasses which are exchanged as required a telescope, which is sharply adjusted to the sight test, and from the graduation on which the refraction may be read off.

This method, however, has not proved to be successful, as in looking through the telescope the person being examined is liable to gain the impression or appreciate that he is looking into an optical instrument, and thus quite involuntarily exert a particular strain on the eyes in an endeavour to adapt his accommodation.

It is the primary object of the present invention to overcome the disadvantage referred to, and to provide an instrument which will enable sight tests to be performed which are perfectly free from error. Other objects and advantages of the invention will become apparent as the description proceeds.

According to the invention it is proposed to employ a telescope as heretofore for determining the refraction of the eye. In order, however, not to arouse in the person being tested the impression that he is looking into an optical instrument, the whole passage of rays in the telescope is disposed in a plane vertical to the direction of sight, so that the entering pupil and exit pupil in the direction of sight are quite close together. In this manner the person being examined has the impression of merely looking through an ordinary eyeglass, and therefore has no reason to vary his accommodation.

The disposal of the passage of the rays in a plane vertical to the direction of sight is preferably so performed, that a glass cube is situated close to the eye, this cube being divided into two halves by an inclined plane. The two sloped faces situated close together are silvered, the one reflecting towards the top and the other in a downward direction. The rays of light proceeding from the image are accordingly thus deflected in an upward direction, and with the assistance of four additional reflections describe a closed path within the plane vertical to the direction of sight until the same again return from below to the inclined reflection face within the glass cube, and then, but not until then, pass to the eye. Within the plane vertical to the direction of sight are situated the centre points of the lenses belonging to the telescope. It is preferable to employ a terrestrial telescope having within the same a plane which is conjugated both to the front face of the cube (situated towards the image) as well as the rear face (situated towards the eye). The adjustment of the telescope to different refractions is effected by varying its length in a direction parallel to the connecting line between the two eyes. In the known manner it is desirable to dispose the location of the eyeglass (the rear face of the glass cube) in the focal point of a fixed convex lens, so that the telescope will require a uniform variation of its length for every ametropia dioptry. In each of the three planes conjugated to each other, viz., the front and rear faces of the glass cube and the plane of the pupils situated within the telescope cylinder glasses or prisms may be provided, which may each consist of two juxtaposed parts, which by means of relative rotation provide in the known manner cylinder or prism combinations of differing strength.

The invention is illustrated by way of example in the accompanying drawings, which are shown diagrammatically for the purpose of better comprehension.

Figure 2:
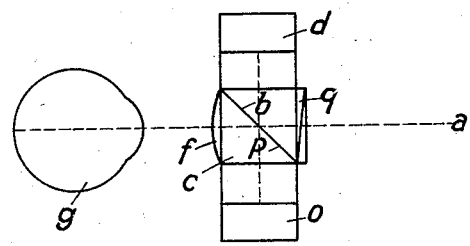
Figure 3:
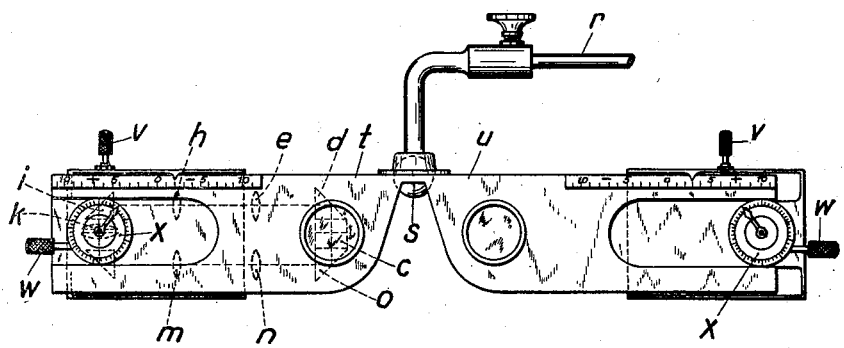

Figs. 1 and 2 show vertical sections through the glass cube,

Fig. 3 being a front view of the complete instrument.

Fig. 1 is a section parallel to the connecting line between both eyes, Fig. 2 being a section vertical to the same. The rays of light proceeding from the image out of the direction $a$ are reflected in an upward direction on the surface $b$ of the glass cube $c$ and pass from there to the reflection prism $d$, which deflects the rays laterally. The same now traverse the convex lens $e$, in the focal point of which is situated the convex lens $f$, which in turn is situated close in front of the eye $g$ of the person being tested. The convex lens $f$ has the object of shortening the whole instrument. The rays then meet the convex lens $h$, in the focal point of which is situated the plane $k$, in which are located two relatively rotatable cylinder lenses. Intermediate $h$ and $k$ is the reflection prims $i$, which deflects the rays in a downward direction, and beyond $k$ the reflection prism $l$, which passes the rays again in the lateral direction until they meet the convex lens $m$. From this point the rays proceed to the convex lens $n$, and from there to the reflection prism $o$, which again directs the same upwards on to the surface $p$, which is situated in close proximity to the surface $b$. Proceeding only from $p$ are the rays passed to the eye $g$ through the medium of the lens $f$. The distance between the lenses $e$ and $h$ and also $n$ and $m$ may be varied simultaneously, thus enabling adjustment to be made for different refractions. On the front face of the glass cube $c$ is also provided a Herschel prism $q$.

The whole arrangement is preferably constructed so as to be double, viz., for the left eye and the right eye, and is mounted on a holder which is oscillatory in front of the face. The two single devices are connected with each other in such manner that their spacial relation in a horizontal direction may be varied in accordance with the distance between the pupils of the tested eyes.

A preclusion of the particular eye not being examined is preferably effected by inserting an opaque disc at some point of the passage of the rays in the telescope.

As shown in Fig. 3, there are provided, suspended from an arm $r$ and connected with each other by means of a ball joint $s$, the two lateral arms $t$ and $u$, the distance between these arms being capable of being adjusted in accordance with the distance between the eyes of the person being examined. The person under examination gazes into $c$ through the view apertures. The length of the lateral arms is adjusted by rotation of the gear $v$ until the person being tested is able to discern a sharp image, and the reading may be taken from the scale $w$. Thus, for example, in the drawings the right eye has a hypermetropia amounting to $+3$ and the left eye a myopia amounting to $-2$ dioptres. The determination of the astigmatism is performed by rotation of the gear $w$, and the strength of the necessary cylinder glass is read off from the disc $x$.

It will be understood that no restriction is made to the exact form of embodiment shown, and that various modifications may be made without departing from the spirit of the invention.

What I claim as new and desire to secure by Letters Patent is:

1. A device for the subjective determination of the eye by measuring the variation of the focus of a lens system disposed between the eye and an object, comprising a frame, a focusing optical system on said frame, and means for varying the focus of said system, said system constituting means for directing light rays from said object in a substantially closed path lying in a plane substantially perpendicular to the line of sight.

2. The invention as set forth in claim 1, wherein said optical system includes a cylindrical lens and wherein is provided means for rotating said lens.

3. The invention as set forth in claim 1, wherein said optical system includes a pair of reflecting prisms having their reflecting surfaces contacting in a plane inclined to the line of sight and a second pair of reflecting prisms disposed in contact respectively with those surfaces of said first prisms which are inclined to the reflecting surfaces thereof and which lie in planes parallel to the line of sight, said second prisms having their reflecting surfaces lying in planes which intersect in a line parallel to the line of sight.

4. A device for the subjective determination of the refraction of the eye by determining the variation of the focus of a lens system disposed between the eye and an object necessary properly to observe the object, comprising a frame, a pair of focusing optical systems in said frame, constituting means for directing rays of light from said object to both eyes respectively, in substantially closed paths lying in a plane substantially perpendicular to the line of sight and means for independently varying the focus of each of said systems.

In testimony whereof, I affix my signature.

WALTHER THORNER.